(12) United States Patent
Park

(10) Patent No.: US 8,731,827 B2
(45) Date of Patent: May 20, 2014

(54) METHOD AND APPARATUS FOR ESTIMATING PATH FOR INDOOR LOCALIZATION

(71) Applicant: Electronics and Telecommunications Research Institute, Daejeon (KR)

(72) Inventor: Manho Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 5 days.

(21) Appl. No.: 13/689,121

(22) Filed: Nov. 29, 2012

(65) Prior Publication Data

US 2013/0151139 A1 Jun. 13, 2013

(30) Foreign Application Priority Data

Dec. 7, 2011 (KR) ........................ 10-2011-0130538

(51) Int. Cl.
  *G01C 21/02* (2006.01)
(52) U.S. Cl.
  USPC ........................................ 701/500

(58) Field of Classification Search
  None
  See application file for complete search history.

(56) References Cited

U.S. PATENT DOCUMENTS

2010/0274536 A1* 10/2010 Okada et al. ............... 703/1
2013/0187552 A1* 7/2013 Frodsham et al. ......... 315/152

FOREIGN PATENT DOCUMENTS

| JP | 2009-229204 A | 10/2009 |
| KR | 10-2009-0066068 A | 6/2009 |
| KR | 10-2009-0087300 A | 8/2009 |
| KR | 10-2010-0059214 A | 6/2010 |
| KR | 10-2011-0068340 A | 6/2011 |

* cited by examiner

*Primary Examiner* — Thomas Tarcza
*Assistant Examiner* — Adam Alharbi
(74) *Attorney, Agent, or Firm* — Rabin & Berdo, P.C.

(57) ABSTRACT

When a user enters an indoor space, such as a building, where it is difficult to obtain absolute positioning information, probable indoor path information is estimated based on outer appearance information of the building that the user is presumed to have entered and the moving distance and moving direction of the user. Also, location information calculated according to an estimated navigation method is selectively corrected by using the estimated indoor path information.

20 Claims, 6 Drawing Sheets

METHOD AND APPARATUS FOR ESTIMATING PATH FOR INDOOR LOCALIZATION

CROSS-REFERENCE TO RELATED APPLICATION

This application claims priority to and the benefit of Korean Patent Application No. 10-2011-0130538 filed in the Korean Intellectual Property Office on Dec. 7, 2011, the entire contents of which are incorporated herein by reference.

BACKGROUND OF THE INVENTION (a) Field of the Invention

The present invention relates to a method and apparatus for estimating a path, and more particularly, to a method and apparatus for estimating a path for indoor localization.

(b) Description of the Related Art

In recent years, the spread of personal mobile devices that are capable of providing location information has been rapidly expanding, and location and geographic information provision services using mobile devices are also rapidly growing. In line with this trend, there are ongoing efforts to properly provide continuous indoor/outdoor localization services using an absolute positioning solution, such as a GPS (global positioning system), and an estimated navigation solution, such as an INS (inertial navigation system) having a multi-sensor structure, without being limited to existing services for the provision of outdoor location information.

A widely used indoor localization algorithm for such a system is an algorithm which additionally uses geographic information about a user's location to correct the location of the user, thereby reducing positioning errors and increasing the accuracy of location information. On the contrary, unlike outdoor localization, an indoor localization algorithm has the problem that it is difficult to reduce positioning errors by user position correction because absolute positioning information such as a GPS is not provided, related topographic information such as building information is hard to obtain, and it is difficult to create accurate map information due to the complexity of the structure of a building.

To solve this problem, much research has been conducted to acquire indoor routing information. Typical methods for this include a method which acquires a map by indoor environmental scanning using a distance measurement sensor such as an ultrasonic sensor, a laser, an infrared sensor, etc., and a method in which, if a user enters an indoor space, information about an indoor path, such as a map or drawing, is transmitted to the user via other information transport paths so that the user can take advantage of this information.

However, the method using a distance measurement sensor is problematic in that an additional sensor for indoor environmental scanning needs to be mounted in a current widely used mobile device of the user. Also, the method of providing information about an indoor path is disadvantageous in that it is necessary to produce information about an indoor environment such as buildings in advance, and process it in a form available to the user.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a method and apparatus for estimating an indoor path through which a user who has entered an indoor space is movable.

The present invention has also been made in an effort to provide a method and apparatus for estimating an indoor path using outer appearance information of a building that a user has entered and location information of the user when entering the building, in a system providing a continuous indoor/outdoor localization service.

An exemplary embodiment of the present invention provides a method for estimating an indoor path, by which a path of a user entering an indoor space of a building from the outside is estimated, the method including: estimating outer appearance information of a building a user has entered and defining an entrance to the building; estimating an external boundary of the building based on the defined entrance to the building; after estimating the external boundary of the building, estimating a first estimated path corresponding to a movement path after the user has entered an indoor space; and if the user moving along the first estimated path changes direction by an angle equal to or more than a set threshold value, estimating a second estimated path based on a change point at which the direction change is made.

The method may further include defining a vertical movement path as the user moving along the first estimated path or second estimated path moves in a direction having vertical or horizontal correlation with the outer appearance information of the building.

The defining of a vertical movement path may include: comparing a vertical movement value of the user with a set vertical threshold value; comparing a horizontal movement value of the user with a set horizontal threshold value; and additionally defining a vertical movement path adjacent to an existing estimated path, based on the comparison results.

The additional defining of a vertical movement path may include: a first step of, if the vertical movement value of the user is greater than the vertical threshold value, which represents a vertical movement by the threshold value or more, and the horizontal movement value of the user is less than the horizontal threshold value, determining that the user has vertically moved by vertical moving means, including an elevator, and defining a prescribed range adjacent to the existing estimated path as a vertical movement path; a second step of, if the vertical movement value of the user is greater than the vertical threshold value, which represents a vertical movement by the threshold value or more, and the horizontal movement value of the user is greater than the horizontal threshold value, which represents a vertical movement by the threshold value or more, determining that the user has vertically moved by vertical moving means, including an escalator or stairs, and defining a prescribed range adjacent to the existing estimated path as a vertical movement path; and a third step of, if the vertical movement value of the user is less than the vertical threshold value, and the horizontal movement value of the user is greater than the horizontal threshold value, which represents a vertical movement by the threshold value or more, determining that the user has moved along level ground.

The first step may include defining a vertical location, which is a location on a path before the vertical movement value is generated, as a vertical movement generation point, and defining a range of the distance corresponding to the vertical movement value of the user from the vertical movement generation point as a vertical movement path.

The second step may include defining a vertical location, which is a location on a path before the vertical movement value is generated, as a vertical movement generation point, and defining a range of the distance corresponding to a sum of the vertical and horizontal movement values of the user from the vertical movement generation point as a vertical movement path.

The method may further include: when the user vertically moves after defining a vertical movement path according to vertical movement of the user, estimating the current vertical location of the user and comparing the estimated vertical location and the vertical location on the existing estimated path; if the difference between the current vertical location of the user and the vertical location on the existing estimated path is equal to or greater than a set vertical location threshold value, determining that the vertical movement path defined according to the vertical movement of the user involves a different floor from the floor on the existing estimated path; and additionally defining the path of user movement as a new path in connection with the vertical movement path information involving a different floor.

Another exemplary embodiment of the present invention provides an apparatus for estimating an indoor path, by which a path of a user entering an indoor space of a building from the outside is estimated, the apparatus including: an estimated navigation unit that estimates the moving direction and moving distance of the user according to an estimated navigation method; a location estimation unit that estimates the location of the user based on the moving distance and moving direction estimated by the estimated navigation unit; a path estimation unit that estimates outer appearance information of the building based on geographic information provided from an external device just before the user enters the building, estimates a first estimated path after the user enters the indoor space, based on the moving direction and moving distance provided from the estimated navigation unit and the outer appearance information of the building, and estimates a second estimated path according to the user's direction change on the first estimated path; and a location correction unit that corrects the location, measured by the location estimation unit according to the estimated navigation method, based on the paths estimated by the path estimation unit.

The path estimation unit may include: an outer appearance information estimation unit that estimates outer appearance information of the building based on geographic information provided from an external device just before the user enters the building; an external boundary estimation unit that defines the entrance to the building, and estimates the external boundary of the building based on the defined entrance to the building and the estimated outer appearance information; a movement path estimation unit that estimates a first estimated path corresponding to a movement path after the user has entered the indoor space based on the estimated external boundary and the moving direction and moving distance provided from the estimated navigation unit, and if it is determined that the user moving along the first estimated path changes direction by a set threshold value or more, based on the moving distance and moving direction of the user provided from the estimated navigation unit, a second estimated path based on a change point at which the direction changes is estimated; a vertical path estimation unit that estimates a path of vertical movement of the user and adds the same to the first or second estimated path; and a path correction unit that performs correction of the existing estimated paths, and if the estimation of a new path is required for the existing estimated paths, the movement path estimation unit is notified of this so that it estimates a new path.

DETAILED DESCRIPTION OF THE EMBODIMENTS

Figure 1:
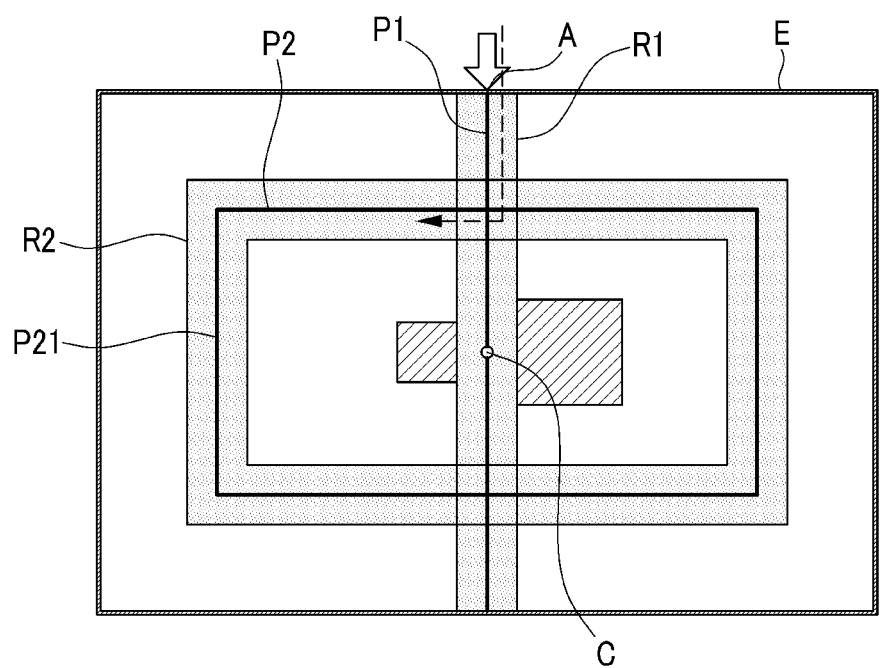
FIG. 1 is an illustration showing an indoor path estimated according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification, unless explicitly described to the contrary, the word "comprise" and variations such as "comprises" or "comprising" will be understood to imply the inclusion of stated elements but not the exclusion of any other elements.

In the following exemplary embodiment, the expressions "first," "second," etc. are not limited to temporal or ordinal relationships, but are used to distinguish different elements.

Hereinafter, a method and apparatus for estimating an indoor path according to an exemplary embodiment of the present invention will be described with reference to the accompanying drawings.

Figure 2:
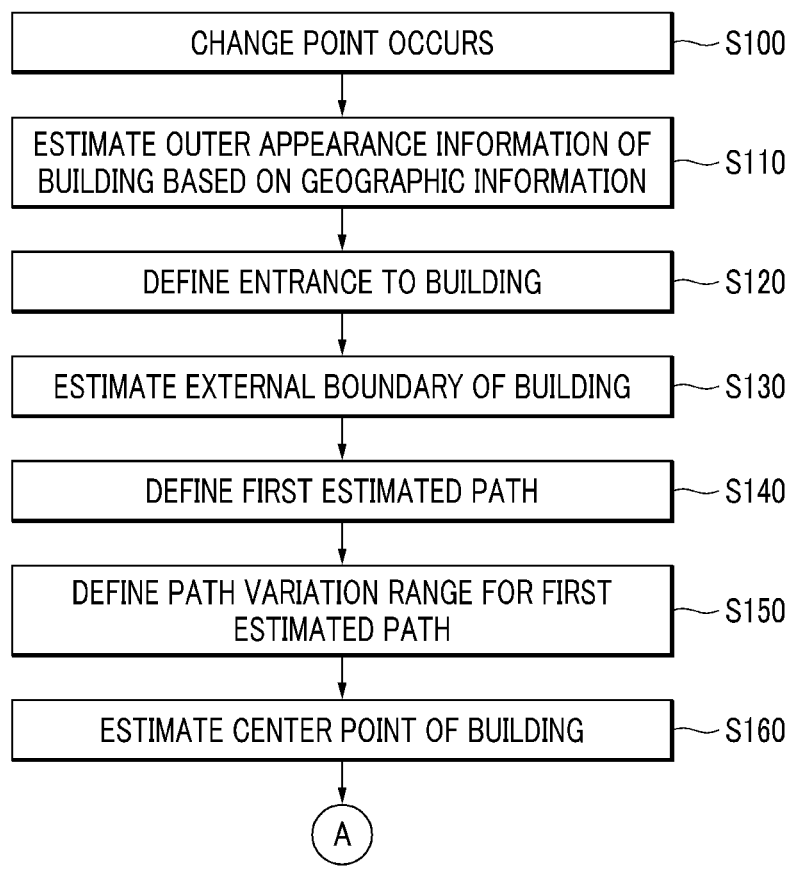
FIGS. 2 and 3 are flowcharts of a method for estimating an indoor path according to an exemplary embodiment of the present invention.
Figure 3:
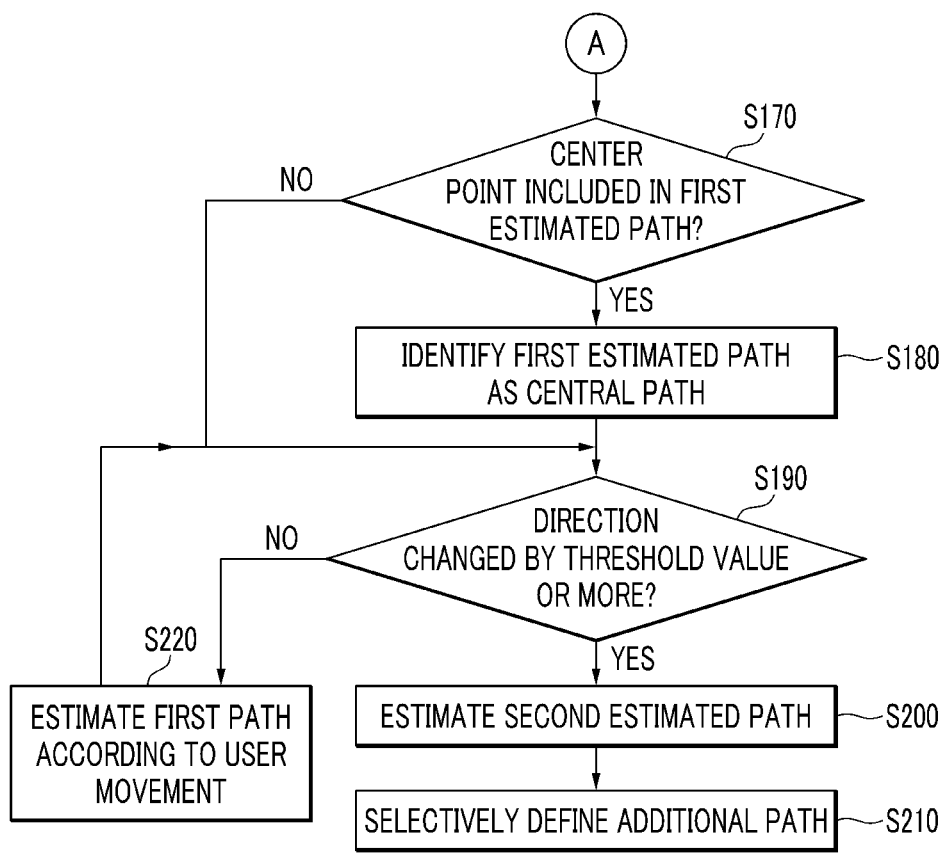

FIG. 1 is a view showing an example of application of a method for estimating an indoor path according to an exemplary embodiment of the present invention, and FIGS. 2 and 3 are flowcharts of a method for estimating an indoor path according to an exemplary embodiment of the present invention.

If a user using a continuous indoor/outdoor localization service based on geographic information enters an indoor space of a building while receiving location information from a continuous indoor/outdoor localization system using absolute positioning information provided from a positioning resource, such as a GPS (global positioning system), the GPS or the like usually loses its information-providing ability. Upon detecting this, the continuous indoor/outdoor localization system changes the positioning method. That is, the positioning method is changed from a method using absolute positioning information provided from a GPS to an estimated navigation-based method using a variety of sensor information. In the following exemplary embodiment, buildings as used herein include all forms of buildings, each having an indoor space separated from the outside.

In an exemplary embodiment of the present invention, if a change point representing a change of the positioning method (S100) occurs, this is perceived as a change in the service environment for the user. That is, the user is deemed to have entered an indoor space. An apparatus for estimating a path according to an exemplary embodiment of the present invention estimates a path of user movement based on the path estimation method described below. Moreover, the user's location is tracked based on a method (hereinafter referred to as an estimated navigation method) for tracking a user's location based on estimated navigation using a variety of sensor information, and correcting the tracked user location based on an estimated path. The estimated navigation method estimates the movement distance and movement direction of the user to detect the user's location by using a plurality of sensors including a gyro sensor, an acceleration sensor, a terrestrial magnetic sensor, and an altitude sensor. This method is a well-known art, so a detailed description thereof will be omitted.

Once the user is deemed as having entered an indoor space, the apparatus for estimating a path according to an exemplary embodiment of the present invention estimates outer appearance information of the building that the user has entered, as shown in FIG. 2. Hereupon, the outer appearance information of the building is estimated based on geographic information provided from a continuous indoor/outdoor localization system (hereinafter referred to as a "continuous localization system" for convenience of explanation) just before the user enters the building (S110). For example, on the assumption that "Seoul City Hall" is searched in a GIS (geographic information system), longitude and latitude information is configured to correspond to the term "Seoul City Hall", and such information may be linked to the main telephone number, address, and additional information (e.g., types of buildings like a public organization, a gas station, a restaurant, etc.). Therefore, it is possible to distinguish whether the place that the user is presumed to have entered is an environment such as a tunnel or a building based on geographic information such as longitude and latitude information and additional detailed information, and to estimate its outer appearance information. Further, geographic information may refer to information which is indicative of spatial relations of a map by adding topographic information spatially representing a location and non-graphic attribute information for explaining and supplementing the shape and functionality of the location.

After estimating the outer appearance information of the building that the user has entered, the path estimation apparatus defines the entrance to the building on the estimated outer appearance information of the building (S120).

In an exemplary embodiment of the present invention, a change point representing a change of the positioning method, that is, a positioning method change point, is defined as the entrance to the building. If the positioning method change point occurs within a set range, the entrance to the building is corrected. Concretely, when a prescribed range relative to the center of one side of the building is set, if a positioning method change point is located within the set range, the entrance to the building is corrected to be the center of one side of the building at the positioning method change point. Accordingly, the center of one side of the building is defined as the entrance that the user is presumed to have entered. By a method other than defining a positioning method change point as the entrance to a building, a location at which the user is presumed to have reached the building can be defined as the entrance to the building, based on the estimated outer appearance information of the building.

After defining the entrance to the building, the path estimation apparatus estimates the external boundary of the building based on the outer appearance information of the building. For example, as shown in FIG. 1, the external boundary E of the building is estimated by linking the estimated outer appearance information of the building with the defined entrance A (S130).

After estimating the external boundary of the building, the path estimation apparatus estimates a first estimated path corresponding to a movement path after the user has entered the indoor space (S140). The defined entrance to the building or an external boundary point corresponding to the entrance to the building is used as the start point. A line is extended from the start point to an external boundary point symmetrical with respect to the external boundary point at which the defined entrance to the building is located, and defined as the first estimated path. For example, as shown in FIG. 1, a straight-line segment connecting the defined entrance to the building and the opposite boundary of the building is defined as the first estimated path P1.

Once the first estimated path is defined, a path variation range is defined for the defined first estimated path. For example, as shown in FIG. 1, a prescribed range, starting from the first estimated path P1 and based on the size of the building obtained from geographic information, is defined as the path variation range R1, or the path variation range R1 starting from the first estimated path is defined based on the value of the width of a probable path which is set by the user (S150).

The path estimation apparatus estimates the center point of the building. Based on the estimated outer appearance information of the building, the center point of the building or an annex of the building is estimated (S160). Distance and buildings are usually represented to have different image characteristics in the GIS system. For example, it is assumed that the external boundary of a building forms a closed curve. In this case, an external boundary is extracted by performing a general image processing process on outer appearance information of a building, and the center of the area of this figure is obtained based on the extracted external boundary and used as the center point.

The center point of a building is estimated assuming that a central path connecting to the entrance is usually located at a center part of a building from a structural point of view, and facilities such as an elevator, an escalator, and stairs for moving to another floor are located in a multistory building.

Next, as shown in FIG. 3, the estimated center point of the building and the first estimated path are compared to determine whether the center point is included in the first estimated path (S170). If the center point is included in the first estimated path, the path estimation apparatus identifies the first estimated path as the central path of the building (or an annex of the building) (S180). If the first estimated path is identified as the central path, the first estimated path is given a weighted value. The weighted value may be used as a weighted value factor for modifying a path of the user moving adjacent to an estimated path to make it as close to the estimated path as possible. Concretely, a path of the user moving adjacent to a path having a higher weighted value may be quickly modified to be the adjacent path (i.e., a path having a higher weighted value). On the contrary, if the center point is not included in the first estimated path, the first estimated path is identified as not being the central path of the building. In this case, the first estimated path is not given a weighted value, or is given a weighted value that is lower than the weighted value given when the first estimated path is identified as the central path.

The user having entered the indoor space of the building may go straight or change direction. If it is determined that the user deemed to have entered the indoor space of the building moves a prescribed distance and then changes direction by a set threshold value or more, a path according to the user's direction changes, that is, a second estimated path is estimated (S190 and S200).

Concretely, the distance from a change point at which the direction change is made to the external boundary of the building is calculated. Then, the change point is defined as the start point of the second estimated path, and the second estimated path is estimated based on the external boundary information of the building estimated from the start point and the distance calculated from the start point. For example, as shown in FIG. 1, a path circling the building or a path where the user can go left or right with respect to the entrance is estimated as the second estimated path P2.

Likewise, a path variation range R2 is defined for the second estimated path. For example, as shown in FIG. 1, a prescribed range, starting from the second estimated path P2, based on the size of the building that is obtained from geographic information, is defined as the path variation range R2, or the path variation range R2 starting from the second estimated path is defined based on the value of the width of a probable path which is set by the user. If the distance between two among second estimated paths estimated by this process is less than a preset distance, the two paths are combined and used as one path.

If the user travels in a direction shifted from the second estimated path by a set threshold value or more while moving along the second estimated path, a path along this direction is estimated and defined as an additional path for the second estimated path (S210).

For example, as shown in FIG. 1, a path that extends from the point of direction change on the second estimated path P2 to the opposite external boundary of the building by a set threshold value or more is defined as the additional path P21. Alternatively, a path of travel starting from the point of direction change from the second estimated path by a set threshold value or more runs in parallel with while maintaining a predetermined distance from the external boundary of the building, and this path extends until it crosses another estimated path. Such a path is defined as an additional path.

After the additional path is defined, the additional path may be maintained or removed in consideration of the displacement or travel time of the user. For example, providing that the displacement of the user moving via the additional path is equal to or less than a set threshold value, or the travel time of the user moving via the additional path is equal to or less than a set threshold value, if the user is deemed to have returned to the original estimated path, the additional path may not be maintained but is removed. Such an additional path may be likewise defined for the first estimated path.

Further, a path of vertical movement is estimated for the user who is moving along the estimated path (first or second estimated path). In general, the user can vertically move by way of an elevator, an escalator, or stairs in the building. The elevator is made to move vertically, and the user's horizontal movement within the elevator is restricted. Thus, the user rarely moves in a horizontal direction while vertically moving by way of the elevator. On the other hand, the escalator or stairs are formed to be slightly tilted in a vertical direction. Thus, the user moves a little in a horizontal direction while moving in a vertical direction by the escalator or stairs. Based on these structural features, in the exemplary embodiment of the present invention, horizontal movement information as well as vertical movement information is additionally used in the event of vertical movement of the user so as to determine by which means the user has vertically moved.

In the case when the center point is not included in the first estimated path in the step S170, or a direction change by a threshold value or more is not made in the step S190, the first path is estimated according to user movement (S220).

Figure 4:
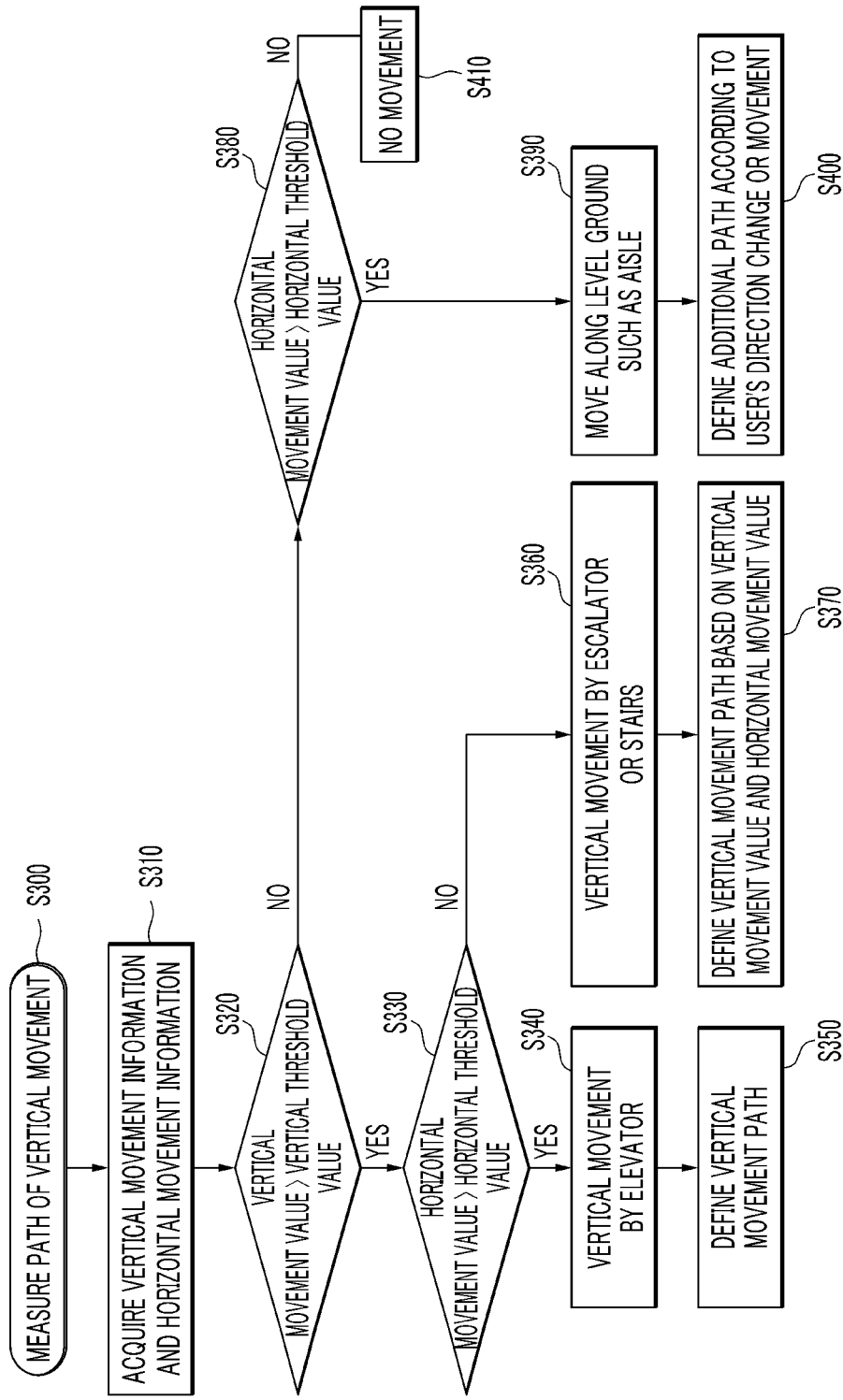
FIG. 4 is a flowchart showing a method for estimating an indoor path of vertical movement according to an exemplary embodiment of the present invention.

FIG. 4 is a flowchart showing a method for estimating an indoor path of vertical movement according to an exemplary embodiment of the present invention.

In the exemplary embodiment of the present invention, estimated navigation information on a moving user is used. The estimated navigation information includes vertical movement information and horizontal movement information, which are obtained using a variety of sensors such as a gyro sensor, an acceleration sensor, etc., and based on the moving direction and moving distance of up-and-down and left-and-right movements of a moving object. The vertical movement information contains a value of the user's vertical movement speed (hereinafter referred to as a vertical movement value), and the horizontal movement information contains a value of the user's horizontal movement speed (hereinafter referred to as a horizontal movement value).

In the exemplary embodiment of the present invention, as shown in FIG. 4, the path estimation apparatus uses the vertical movement information and the horizontal movement information (S300 and S310) to estimate a path of vertical movement by the following process.

(Equation 1)
If (Move_v >=Thr_v) and (Movh_h < Thr_h)
    Possible Move = elevator;
Else if (Move_v >= Thr_v) and (Move_h >= Thr_h)
    Possible_Move = stairs;
Else if (Move_v <Thr_v) and (Move_h >= Thr_h)
    Possible Move = aisle;

Here, Move_v denotes a vertical movement value of the user, and Thr_v denotes a set vertical threshold value for vertical movement. Move_h denotes a horizontal movement value of the user, and Thr_h denotes a set horizontal threshold value for horizontal movement. Possible_Move denotes an estimated path.

The vertical movement value of the user and the set vertical threshold value are compared, and the horizontal movement value of the user and the set horizontal threshold value are compared (S320 and S330).

If the vertical movement value of the user is greater than the vertical threshold value, which represents a vertical movement by the threshold value or more, and the horizontal movement value of the user is less than the horizontal threshold value, it is determined that the user has used a vertical moving means, such as an elevator (S340). Also, a prescribed range adjacent to an existing estimated path is defined as a vertical movement path, and the defined vertical movement path is included in the estimated path (S350). For example, a location (particularly a location on the vertical axis, hereinafter referred to as a vertical location) on a path before the vertical movement value is generated is defined as a vertical movement generation point, and a range of the distance corresponding to the vertical movement value of the user from the vertical movement generation point is defined as a vertical movement path. Here, the range of the vertical movement path can be defined by the user.

If the vertical movement value of the user is greater than the vertical threshold value, which represents a vertical movement by the threshold value or more, and the horizontal movement value of the user is greater than the horizontal threshold value, which represents a vertical movement by the threshold value or more, it is determined that the user has used a vertical moving means, such as an escalator or stairs, while horizontally moving to some extent (S360). Also, a prescribed range adjacent to the existing estimated path and including this movement path is defined as a vertical movement path, such as an escalator or stairs, and the defined vertical movement path is included in the estimated path (S350). For example, a vertical location on a path before the vertical movement value is generated is defined as a vertical movement generation point, and a range of the distance corresponding to the vertical movement value and the horizontal movement value of the user from the vertical movement generation point is defined as a vertical movement path. Here, the range of the vertical movement path can be defined by the user.

If the vertical movement value of the user is less than the vertical threshold value, and the horizontal movement value of the user is greater than the horizontal threshold value, which represents a vertical movement by the threshold value or more (S380), it is determined that the user has moved along level ground, such as an aisle (S390). In the case of movement along level ground, such as an aisle, an additional path is defined according to the user's direction change or movement, thus correcting the existing estimated path (S400).

If the vertical movement value of the user is less than the vertical threshold value, and the horizontal movement value of the user is less than the horizontal threshold value, it is determined that there is no movement (S410). However, the present invention is not limited to the above description.

As stated above, the user may horizontally move after vertical movement. In this case, a vertical location change has been made to the existing estimated path, and the current vertical position and the vertical position on the existing estimated path are compared to determine whether to define a new path.

Concretely, when the user has vertically moved a certain distance and then horizontally moved, the current vertical location of the user is estimated, and the estimated vertical location and the vertical location (e.g., the location on the path before a vertical movement value is generated) on the existing estimated path are compared. If the difference between the current estimated vertical location of the user and the vertical location on the estimated path is equal to or greater than a set vertical location threshold value, it is determined that vertical movement path information relative to the current vertical location involves a different floor from the floor on the existing estimated path. Also, a new path is estimated in connection with the vertical movement path information relative to the current vertical location. For example, a new path starting from the current vertical location of the user is additionally defined according to the moving direction and moving distance of the user, in connection with the vertical movement path information. At this point, the existing estimated path including the vertical location, i.e., previous floor the user has just left, may be reflected according to a user setting when estimating a new path. In this case, a weighted value may be given to the estimated path including the previous floor and used to estimate a new path. As described above, the weighted value may be used as a weighted value factor for modifying a path of the user moving adjacent to an estimated path to make it as close to the estimated path as possible.

By the above-described process, a plurality of estimated paths can be acquired according to horizontal and vertical movements of the user who has entered an indoor space of a building. The thus-estimated paths can be used to correct user's location information acquired by the estimated navigation method. Location correction may be performed based on a variety of methods (e.g., a location correction method using a probabilistic model or arithmetic method) available in the art.

Meanwhile, if an error occurs because the user's location is shifted from the estimated path, acquired according to the exemplary embodiment of the present invention, by a set error threshold value or more, it is determined that the estimated path for the building is not valid. In this case, uncorrected location information measured according to the estimated navigation method is provided to the user.

Next, the structure of an apparatus for estimating a path according to an exemplary embodiment of the present invention, which performs indoor path estimation based on the above-described method, will be described.

Figure 5:
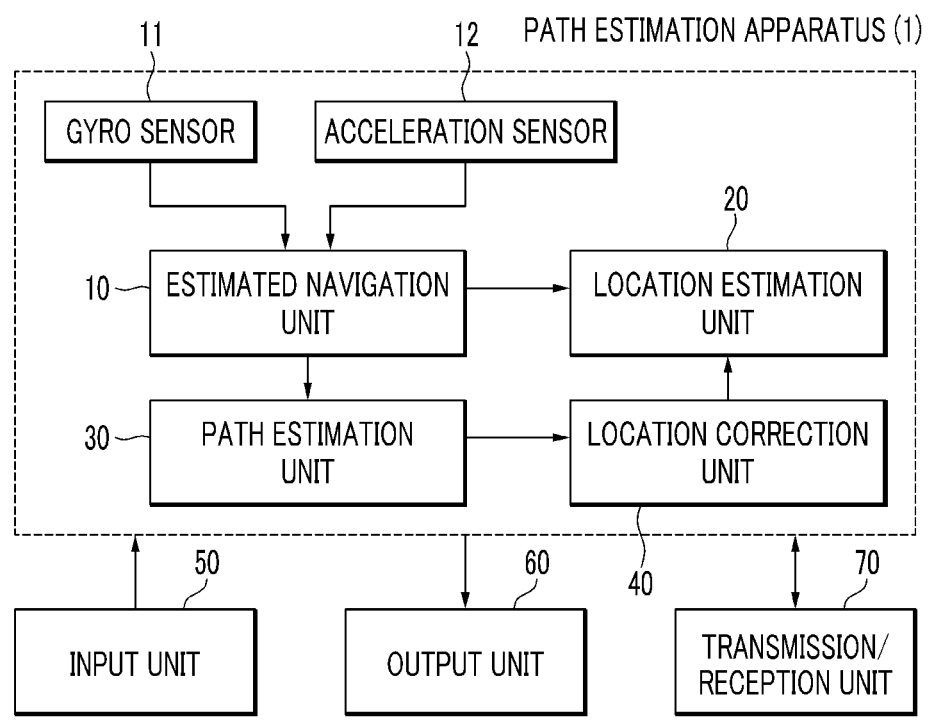
FIG. 5 is a view showing the structure of an apparatus for estimating a path according to an exemplary embodiment of the present invention.

FIG. 5 is a view showing the structure of an apparatus for estimating a path according to an exemplary embodiment of the present invention.

As shown in FIG. 5, the apparatus for estimating a path according to the exemplary embodiment of the present invention may include an estimated navigation unit 10, a location estimation unit 20, a path estimation unit 30, and a location correction unit 40. The path estimation apparatus may further include an input unit 50 and an output unit 60. The path estimation apparatus may further include a transmission/reception unit 70 for receiving geographic information from the outside and providing it to the path estimation unit 30.

The estimated navigation unit 10 estimates the moving direction and moving distance the user has moved from the initial location during a predetermined period of time. Therefore, once the initial location and the moving distance and moving direction relative to the initial location are known, the current location can be estimated. To estimate moving direction and moving distance, the estimated navigation unit 10 can use a terrestrial magnetic sensor 11 and an acceleration sensor 12.

The terrestrial magnetic sensor 11 is a sensor capable of detecting the flow of a magnetic field of the earth to enable azimuth detection, which can be used to estimate the moving direction of the user. In the exemplary embodiment of the present invention, the terrestrial magnetic sensor 11 is used to determine whether the user has changed the moving direction.

The acceleration sensor 12 measures the acceleration of user movement. The user's moving distance can be measured based on the measured acceleration. For example, the number of footsteps of the user can be detected by sensing periodic changes of signals output from the acceleration sensor, and the moving distance can be estimated by using the detected number of footsteps of the user and the user's stride length. Alternatively, the moving distance can be estimated by obtaining the movement speed of the user, based on information obtained from the acceleration sensor 12, and multiplying it by travel time. As the acceleration sensor 12, for example, a piezoelectric accelerometer may be used, which takes advantage of the effect of converting the dynamic properties of piezoelectric materials into electrical properties. Moreover, the accelerometer can be also used when applying shear force, as well as compression force, by converting dynamic properties into electrical properties. Further, various types of acceleration sensors, including a vibration sensor, a strain gauge sensor, an electrodynamic sensor, a servo-type sensor, etc., can be used.

After the positioning method is changed from the method using absolute positioning information provided from a GPS to the estimated navigation-based method using a variety of sensor information, the estimated navigation unit 10 estimates the moving direction and moving distance of the user based on a signal measured by each of the sensors. Also, the location estimation unit 20 estimates the current location based on the moving distance and moving direction, measured by the estimated navigation unit 10, the user has moved from the initial location. For example, the current location is estimated by using the entrance to the building defined by the path estimation unit 30 as the initial location, and then using the moving distance and moving direction of the user, measured by the estimated navigation unit 10, relative to the initial location.

Figure 6:
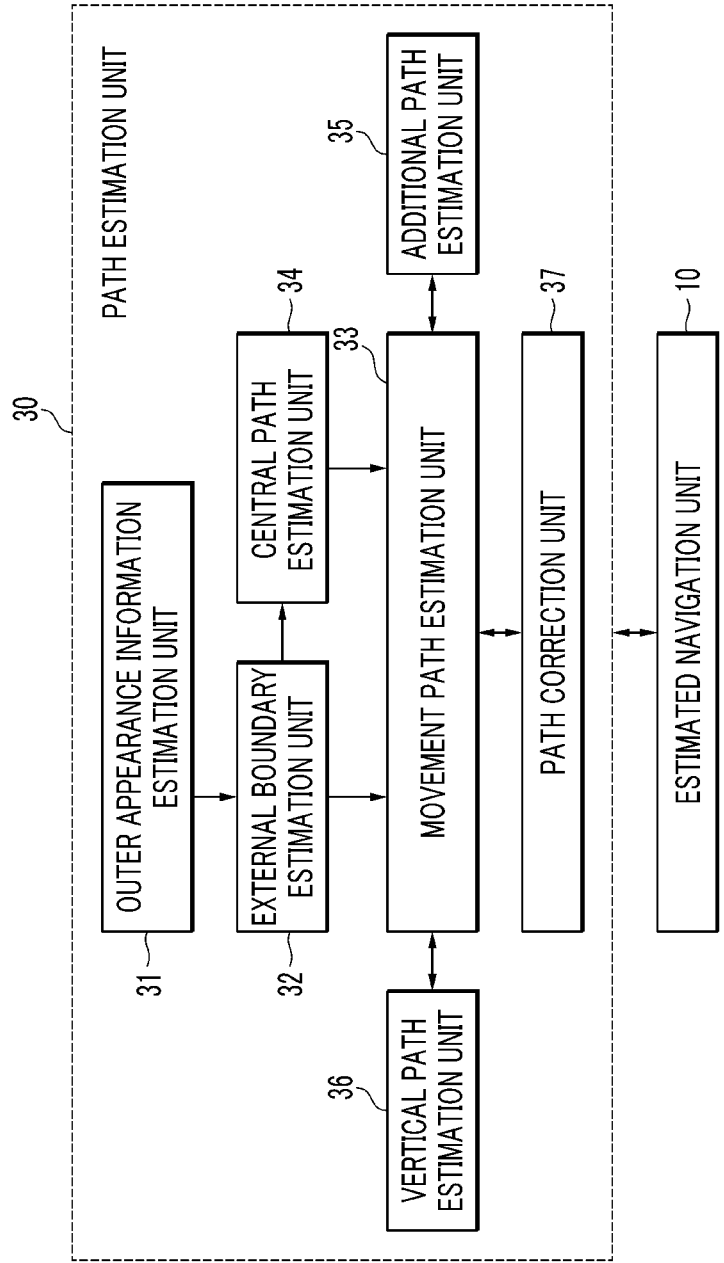
FIG. 6 is a view showing the structure of a path estimation unit according to an exemplary embodiment of the present invention.

FIG. 6 is a view showing the structure of a path estimation unit according to an exemplary embodiment of the present invention.

As shown in FIG. 6, the path estimation unit 30 includes an outer appearance information estimation unit 31, an external boundary estimation unit 32, a movement path estimation unit 33, a central path estimation unit 34, an additional path estimation unit 35, a vertical path estimation unit 36, and a path correction unit 37.

The outer appearance information estimation unit 31 estimates outer appearance information of a building based on geographic information provided from the outside just before the user enters an indoor space of the building. The external boundary estimation unit 32 defines a positioning method change point as the entrance to the building, and estimates the external boundary of the building based on the defined entrance to the building and the estimated outer appearance information.

The movement path estimation unit 33 estimates a first estimated path corresponding to a movement path after the user has entered the indoor space. Further, a path variation range is defined for the defined first estimated path.

The central path estimation unit 34 estimates the center point of the building, and compares the estimated center point of the building and the first estimated path. If the center point is included in the first estimated path, the central path estimation unit 34 identifies the first estimated path as the central path of the building. If the first estimated path is identified as the central path, the first estimated path may be given a weighted value.

If it is determined that the user having entered the indoor space of the building and moving therein changes direction by a set threshold value or more, based on the moving distance and moving direction of the user provided from the estimated navigation unit 10, the movement path estimation unit 33 defines a change point at which the direction change is made as the start point of a second estimated path, and estimates the second estimated path based on the external boundary information of the building estimated from the start point and the distance calculated from the start point. Likewise, a path variation range is defined for the second estimated path.

If the user travels in a direction shifted by a set threshold value or more while moving along an estimated path, the additional path estimation unit 35 estimates a path along this direction and defines it as an additional path for the estimated path.

The vertical path estimation unit 36 estimates a path of vertical movement of the user. Concretely, the vertical path estimation unit 36 estimates a path of vertical movement of the user moving along an estimated path (first or second estimated path), and compares estimated navigation information, i.e., vertical movement information and horizontal movement information, provided from the estimated navigation unit 10, with a set vertical threshold value and a set horizontal threshold value to estimate a vertical movement path. For example, a range of the distance corresponding to the vertical and horizontal movement values of the user from a vertical movement generation point is defined as a vertical movement path. The thus-defined vertical movement path can be included in the first estimated path or second estimated path.

The path correction unit 37 performs correction of the existing estimated paths, and if the estimation of a new path is required for the existing estimated paths, notifies the movement path estimation unit 33 of this so that it estimates a new path. For example, when the user has vertically moved and then horizontally moved, if there is a difference between the current vertical location of the user and the vertical location on an existing estimated path, the path correction unit 37 notifies the movement path estimation unit 33 of this so that it defines a new path starting from the current vertical location of the user according to the moving direction and moving distance of the user.

By means of the path estimation unit 30 having the above-described structure, a plurality of estimated paths are acquired according to horizontal and vertical movements of the user who has entered the indoor space of the building. Then, the location correction unit 40 of the path estimation apparatus 1 estimates the current location, measured by the location estimation unit according to the estimated navigation method, based on the plurality of estimated paths.

The input unit 50 of the path estimation apparatus 1 receives user-selected data, and delivers it to the respective units 10 to 40. In particular, when the user sets a range used for path estimation by themselves, the input unit 50 provides data corresponding to the set range to the path estimation unit 30. The output unit 60 outputs an estimated path or estimated location to allow the user to recognize it.

The path estimation apparatus having the above-described structure according to the exemplary embodiment of the present invention can be implemented in such a manner as to be included in a continuous indoor/outdoor localization system, and the continuous indoor/outdoor localization system can be implemented in such a manner as to be included in a portable terminal. The continuous indoor/outdoor localization system is able to receive geographic information or the like through an external device such as a GPS.

In the above-described exemplary embodiment, a cross-point between a path of user movement and estimated outer appearance information of the building may be detected and defined as the entrance to the building.

According to an exemplary embodiment of the present invention, in a navigation system using a continuous indoor/outdoor localization service, an indoor path of user movement can be estimated efficiently, even in an environment where the user has entered an indoor space from the outside and hence cannot receive absolute positioning information from a localization resource such as a GPS.

Moreover, any operation error of a sensor measured in an indoor estimated navigation method using a variety of sensor information, or any error in user location caused by inaccuracy of a localization algorithm, can be corrected based on the estimated indoor path. Therefore, location measurement can be performed more efficiently and reliably, and a location-related service can be provided to the user even when the user is indoors based on a measured location.

The above-described embodiment can be realized through a program for realizing functions corresponding to the configuration of the embodiments or a recording medium for recording the program in addition to through the above-described apparatus and/or method, which is easily realized by a person skilled in the art.

While this invention has been described in connection with what is presently considered to be practical embodiments, it is to be understood that the invention is not limited to the disclosed embodiments, but, on the contrary, is intended to cover various modifications and equivalent arrangements included within the spirit and scope of the appended claims.

What is claimed is:

1. A method for estimating a path of a user entering an indoor space of a building from an outside thereof, the method comprising:

estimating outer appearance information of the building and defining an entrance to the building;

estimating an external boundary of the building based on the defined entrance to the building;

after estimating the external boundary of the building, obtaining movement information of the user using at least one of a plurality of sensors including a gyro sensor, an acceleration sensor, a terrestrial magnetic sensor and an altitude sensor, estimating a first estimated path corresponding to a movement path of the user within the indoor space based on the obtained movement information; and upon detection of a moving direction change of the user moving along the first estimated path by an angle equal to or more than a set threshold value, estimating a second estimated path based on a change point at which the direction change is made.

2. The method of claim 1, further comprising, if the user travels in a direction shifted from the first or second estimated path by a set threshold value or more, estimating a path along this direction and defining the same as an additional path for the first or second estimated path.

3. The method of claim 2, wherein, in the defining of an additional path, if the user moving along the estimated path changes direction by a set range or greater, a path that extends from the point of direction change to the opposite external boundary of the building or until the path crosses another estimated path is additionally defined.

4. The method of claim 3, wherein, in the defining of an additional path, providing that the displacement of the user moving via the additional path is equal to or less than a set threshold value, or the travel time of the user moving via the additional path is equal to or less than a set threshold value, if the user is deemed as having returned to the original estimated path, the additional path is removed.

5. The method of claim 1, further comprising defining a vertical movement path as the user moving along the first estimated path or second estimated path moves in a direction having vertical or horizontal correlation with the outer appearance information of the building.

6. The method of claim 5, wherein the defining of a vertical movement path comprises:

comparing a vertical movement value of the user with a set vertical threshold value;

comparing a horizontal movement value of the user with a set horizontal threshold value; and additionally defining a vertical movement path adjacent to an existing estimated path, based on the comparison results.

7. The method of claim 6, wherein the additional defining of a vertical movement path comprises:

a first step of, if the vertical movement value of the user is greater than the vertical threshold value, which represents a vertical movement by the threshold value or more, and the horizontal movement value of the user is less than the horizontal threshold value, determining that the user has vertically moved by vertical moving means, including an elevator, and defining a prescribed range adjacent to the existing estimated path as a vertical movement path;

a second step of, if the vertical movement value of the user is greater than the vertical threshold value, which represents a vertical movement by the threshold value or more, and the horizontal movement value of the user is greater than the horizontal threshold value, which represents a vertical movement by the threshold value or more, determining that the user has vertically moved by vertical moving means, including an escalator or stairs, and defining a prescribed range adjacent to the existing estimated path as a vertical movement path; and a third step of, if the vertical movement value of the user is less than the vertical threshold value, and the horizontal movement value of the user is greater than the horizontal threshold value, which represents a vertical movement by the threshold value or more, determining that the user has moved along level ground.

8. The method of claim 7, wherein the first step comprises defining a vertical location, which is a location on a path before the vertical movement value is generated, as a vertical movement generation point, and defining a range of the distance corresponding to the vertical movement value of the user from the vertical movement generation point as a vertical movement path.

9. The method of claim 7, wherein the second step comprises defining a vertical location, which is a location on a path before the vertical movement value is generated, as a vertical movement generation point, and defining a range of the distance corresponding to the vertical and horizontal movement values of the user from the vertical movement generation point as a vertical movement path.

10. The method of claim 6, further comprising:

when the user vertically moves after defining a vertical movement path according to vertical movement of the user, estimating the current vertical location of the user and comparing the estimated vertical location and the vertical location on the existing estimated path;

if the difference between the current vertical location of the user and the vertical location on the existing estimated path is equal to or greater than a set vertical location threshold value, determining that the vertical movement path defined according to the vertical movement of the user involves a different floor from the floor on the existing estimated path; and additionally defining the path of user movement as a new path in connection with the vertical movement path information involving a different floor.

11. The method of claim 10, wherein the additional defining of a new path further comprises, if an estimated path including a different floor from the current floor to which the user has moved exists, giving a weighted value to the path of user movement to the current floor.

12. The method of claim 1, wherein, in the defining of the entrance to the building, when the user enters the building, outer appearance information of the building is estimated based on geographic information provided according to a geographic information service.

13. The method of claim 1, wherein, in the defining of the entrance to the building, as the user enters an indoor space from the outside, a change point at which a user location measurement method is changed to an estimated navigation method is defined as the entrance to the building.

14. The method of claim 13, wherein, in the defining of the entrance to the building, if the change point is located within a prescribed range relative to the center of one side of the building, the entrance to the building is corrected to be the center of one side of the building at the change point.

15. The method of claim 1, wherein, in the defining of the entrance to the building, a cross-point between a path of user movement and estimated outer appearance information of the building is detected and defined as the entrance to the building.

16. The method of claim 1, wherein, in the estimating of a first estimated path, the defined entrance to the building is used as the start point, and a line extended from the start point to an external boundary point symmetrical with respect to the external boundary point at which the defined entrance to the building is located is defined as the first estimated path.

17. The method of claim 1, wherein the estimating of a first estimated path further comprises:
- estimating the center point of the building;
- comparing the center point and the first estimated path; and
- if the center point is included in the first estimated path, defining the first estimated path as the central path of the building.

18. The method of claim 1, further comprising correcting the user's location measured according to the estimated navigation-based method based on the first and second estimated paths.

19. The method of claim 1, further comprising, if a shift in user location from the estimated path, measured according to the estimated navigation-based method, is equal to or more than a set error threshold value per unit time, it is determined that the estimated path is not valid.

20. An apparatus for estimating a path of a user entering an indoor space of a building from an outside thereof, the apparatus comprising:

- an estimated navigation unit that estimates a moving direction and a moving distance of the user according to an estimated navigation method;
- a location estimation unit that estimates a location of the user based on the moving distance and the moving direction estimated by the estimated navigation unit;
- a path estimation unit that estimates outer appearance information of the building based on geographic information provided from an external device just before the user enters the building, estimates a first estimated path after the user enters the indoor space, based on the moving direction and the moving distance provided from the estimated navigation unit and the estimated outer appearance information of the building, and, upon detection of a change of the moving direction of the user moving along the first estimated path by an angle not lower than a set threshold, estimates a second estimated path based on the detected direction change; and
- a location correction unit that corrects the location, measured by the location estimation unit according to the estimated navigation method, based on the first and second estimated paths estimated by the path estimation unit.

* * * * *